(12) United States Patent
Higo

(10) Patent No.: US 10,157,456 B2
(45) Date of Patent: Dec. 18, 2018

(54) INFORMATION PROCESSING APPARATUS, INFORMATION PROCESSING METHOD, AND STORAGE MEDIUM UTILIZING TECHNIQUE FOR DETECTING AN ABNORMAL STATE SUCH AS A SCRATCH ON A TARGET

(71) Applicant: CANON KABUSHIKI KAISHA, Tokyo (JP)

(72) Inventor: Tomoaki Higo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/063,965

(22) Filed: Mar. 8, 2016

(65) Prior Publication Data
US 2016/0267647 A1 Sep. 15, 2016

(30) Foreign Application Priority Data
Mar. 10, 2015 (JP) .................................. 2015-047633

(51) Int. Cl.
*G06T 9/00* (2006.01)
*G06T 7/00* (2017.01)

(52) U.S. Cl.
CPC .. *G06T 7/0004* (2013.01); *G06T 2207/10024* (2013.01); *G06T 2207/10152* (2013.01); *G06T 2207/30164* (2013.01)

(58) Field of Classification Search
None
See application file for complete search history.

(56) References Cited

U.S. PATENT DOCUMENTS

| 5,107,845 | A | * | 4/1992 | Guern | A61B 5/113 348/143 |
| 5,835,220 | A | * | 11/1998 | Kazama | G01J 4/04 356/369 |
| 5,960,104 | A | * | 9/1999 | Conners | G01N 21/8986 144/402 |
| 6,031,933 | A | * | 2/2000 | Kumagai | A63B 47/008 356/426 |

(Continued)

FOREIGN PATENT DOCUMENTS

| JP | 2006313146 A | 11/2006 |
| JP | 2009097977 A | 5/2009 |
| JP | 2013-137239 A | 7/2013 |

*Primary Examiner* — Feng Niu
(74) *Attorney, Agent, or Firm* — Canon U.S.A., Inc. IP Division

(57) ABSTRACT

An information processing apparatus for, to classify and detect a plurality of types of defects, detecting a defect in a target object without using data obtained by prior learning includes an acquisition unit configured to acquire an image group obtained by capturing a target object irradiated with light from a plurality of illumination units placed at a plurality of different positions, a generation unit configured to, based on luminance information of images included in the image group, generate a first luminance profile indicating a change in a luminance value of a first region, which is a region corresponding between the images, and a second luminance profile indicating a change in a luminance value of a second region, which is a region corresponding between the images, and a detection unit configured to detect a defect in the target object based on the first luminance profile and the second luminance profile.

10 Claims, 17 Drawing Sheets

(56) References Cited

U.S. PATENT DOCUMENTS

| | | | | |
|---|---|---|---|---|
| 6,137,528 A * | 10/2000 | Ashizaki | G02B 3/0043 | 348/125 |
| 6,278,482 B1 * | 8/2001 | Ashizaki | G02B 3/0043 | 264/1.7 |
| 6,501,545 B2 * | 12/2002 | Komuro | G01N 21/9501 | 257/E21.528 |
| 7,224,360 B2 * | 5/2007 | Tatsumi | G06T 15/506 | 345/420 |
| 7,446,864 B2 * | 11/2008 | Okabe | G01N 21/8806 | 356/237.1 |
| 7,480,407 B2 * | 1/2009 | Imamura | G06K 9/2036 | 382/173 |
| 7,848,563 B2 * | 12/2010 | Sakai | G06T 7/001 | 382/144 |
| 8,072,608 B2 * | 12/2011 | Steffens | G01B 11/2441 | 356/479 |
| 8,249,329 B2 * | 8/2012 | Silver | G06K 9/4609 | 382/141 |
| 8,290,238 B2 * | 10/2012 | Silver | G06K 9/4609 | 382/100 |
| 8,422,729 B2 * | 4/2013 | Silver | G06K 9/4609 | 382/100 |
| 8,467,594 B2 * | 6/2013 | Sakai | G06T 7/001 | 382/149 |
| 8,588,466 B2 * | 11/2013 | Ikeda | G06T 7/254 | 382/103 |
| 8,630,478 B2 * | 1/2014 | Silver | G06K 9/4609 | 382/100 |
| 8,644,555 B2 * | 2/2014 | Murashita | H04N 5/23248 | 382/103 |
| 8,663,114 B2 * | 3/2014 | Kanayama | G01S 7/52036 | 382/131 |
| 8,824,774 B2 * | 9/2014 | Sakai | G06T 7/001 | 382/149 |
| 8,891,852 B2 * | 11/2014 | Eames | G06T 7/0004 | 382/141 |
| 9,183,443 B2 * | 11/2015 | Eames | G06T 7/0004 | |
| 9,310,278 B2 * | 4/2016 | Sukegawa | G01B 11/24 | |
| 2006/0018540 A1 * | 1/2006 | Imamura | G06K 9/2036 | 382/173 |
| 2009/0059208 A1 * | 3/2009 | Steffens | G01B 9/04 | 356/73 |
| 2011/0304705 A1 * | 12/2011 | Kantor | A61B 5/0059 | 348/49 |
| 2015/0355101 A1 * | 12/2015 | Sun | H04N 13/254 | 348/46 |
| 2016/0148365 A1 * | 5/2016 | Tsuda | C21B 7/24 | 382/141 |
| 2016/0210524 A1 * | 7/2016 | Hasegawa | G01N 21/85 | |
| 2016/0270665 A1 * | 9/2016 | Kantor | A61B 5/0059 | |

* cited by examiner

INFORMATION PROCESSING APPARATUS, INFORMATION PROCESSING METHOD, AND STORAGE MEDIUM UTILIZING TECHNIQUE FOR DETECTING AN ABNORMAL STATE SUCH AS A SCRATCH ON A TARGET

BACKGROUND OF THE INVENTION

Field of the Invention

The present invention relates to a technique for detecting an abnormal state such as a scratch on a target object.

Description of the Related Art

A technique for detecting as a defect an abnormal state such as a scratch on the surface of a product or a component is termed defect inspection or abnormality detection and is widely known as a technique for use in automated manufacturing and inspection. The appearance of a scratch on the surface of a target object changes depending on the surrounding light source environment or the angle of observation. To that end, the manner of shedding light from a light source has been contrived, and a technique for further performing image processing to appropriately visualize an abnormal state such as a scratch has been discussed for a long time. The publication of Japanese Patent Application Laid-Open No. 2006-313146 discusses a method for using color light sources for coaxial epi-illumination and oblique incidence illumination to simultaneously inspect a depression/protrusion defect and a hue defect by capturing an image once. The publication of Japanese Patent Application Laid-Open No. 2009-097977 discusses a technique for using light sources already calibrated in at least four directions and a camera to determine whether a scratch portion is a protrusion or a depression. Further, the publication of Japanese Patent Application Laid-Open No. 2013-137239 discusses a method for comparing the results of measurements using light sources having three different types of wavelengths with master data to detect three states including a depression and a protrusion, a change in color tone, and a shine.

However, the technique in Japanese Patent Application Laid-Open No. 2006-313146 needs to calibrate the coaxial epi-illumination and the oblique incidence illumination, and the apparatus configuration is complicated. Further, the technique in Japanese Patent Application Laid-Open No. 2009-097977 cannot handle a defect and an abnormality other than a depression and a protrusion. Further, the technique in Japanese Patent Application Laid-Open No. 2013-137239 requires prior learning and a database such as master data and therefore cannot be applied to an unknown target object. Further, if a shadow falls on a target object, this technique may erroneously detect the shadow as a scratch.

SUMMARY OF THE INVENTION

According to an aspect of the present invention, for example, an information processing apparatus for detecting a defect in a target object without using data obtained by prior learning includes an acquisition unit configured to acquire an image group obtained by imaging a target object irradiated with light from a plurality of illumination units placed at a plurality of different positions, a generation unit configured to, based on luminance information of images included in the image group, generate a first luminance profile indicating a change in a luminance value of a first region, which is a region corresponding between the images, and a second luminance profile indicating a change in a luminance value of a second region, which is a region corresponding between the images, and a detection unit configured to detect a defect in the target object based on the first luminance profile and the second luminance profile.

According to the specification of the present application, even if a target object is unknown or a shadow falls on a target object, it is possible to classify and detect a plurality of abnormal states as defects.

Further features of the present invention will become apparent from the following description of exemplary embodiments with reference to the attached drawings.

DESCRIPTION OF THE EMBODIMENTS

An information processing apparatus according to exemplary embodiments of the present invention will be described in detail below.

Figure 17:
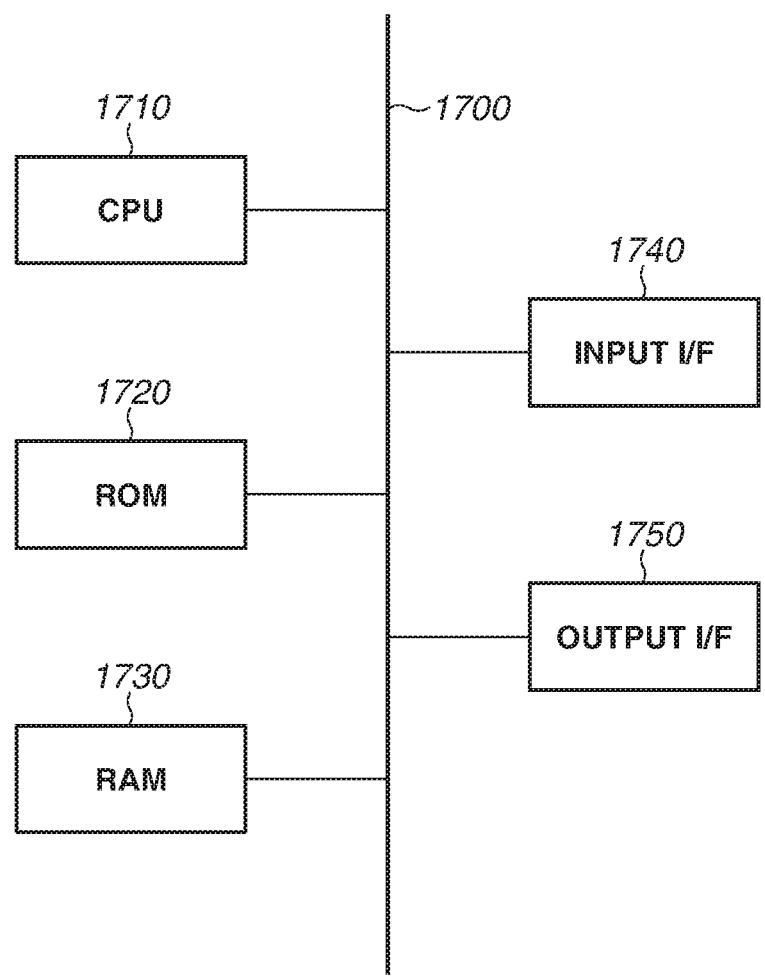
FIG. 17 is a diagram illustrating an example of a hardware configuration of an information processing apparatus according to the present invention.

Prior to the description of the exemplary embodiments of the present invention, with reference to FIG. 17, a description is given of a hardware configuration in which the information processing apparatus according to each exemplary embodiment is implemented.

FIG. 17 is a hardware configuration diagram of the information processing apparatus according to a present exemplary embodiment. In FIG. 17, a central processing unit (CPU) 1710 performs overall control of each device connected to the CPU 1710 via a bus 1700. The CPU 1710 reads and executes a processing step and a program stored in a read-only memory (ROM) 1720. An operating system (OS), each processing program according to the present exemplary embodiment, and a device driver are stored in the ROM 1720, temporarily stored in a random-access memory (RAM) 1730, and appropriately executed by the CPU 1710. Further, an input interface (I/F) 1740 receives from an external apparatus (a display apparatus or an operation apparatus) an input signal in a format that can be processed by an information processing apparatus 1100. Further, an output I/F 1750 outputs to an external apparatus (a display apparatus) an output signal in a format that can be processed by the display apparatus.

A first exemplary embodiment of the present invention is described below. An information processing apparatus 1100 according to the first exemplary embodiment, using a sequence of images captured while lighting and extinguishing a plurality of light sources on a target object, compares time-series changes in the luminance of pixels, and specifies a change in appearance that occurs due to the differences in shape, surface color, and glossiness, thereby classifying the specified change into a plurality of types of abnormal states such as a shape defect, a hue defect, and a gloss defect without using a database. Further, based on the distribution of the time-series maximum value and minimum value in the same pixel, the information processing apparatus 1100 specifies a shadow and a highlight that occur on the surface of the target object, thereby performing processing so that the information processing apparatus 1100 does not erroneously classify the change as being abnormal under the influence of the shadow and the highlight.

[Configuration of Apparatus]

Figure 1:
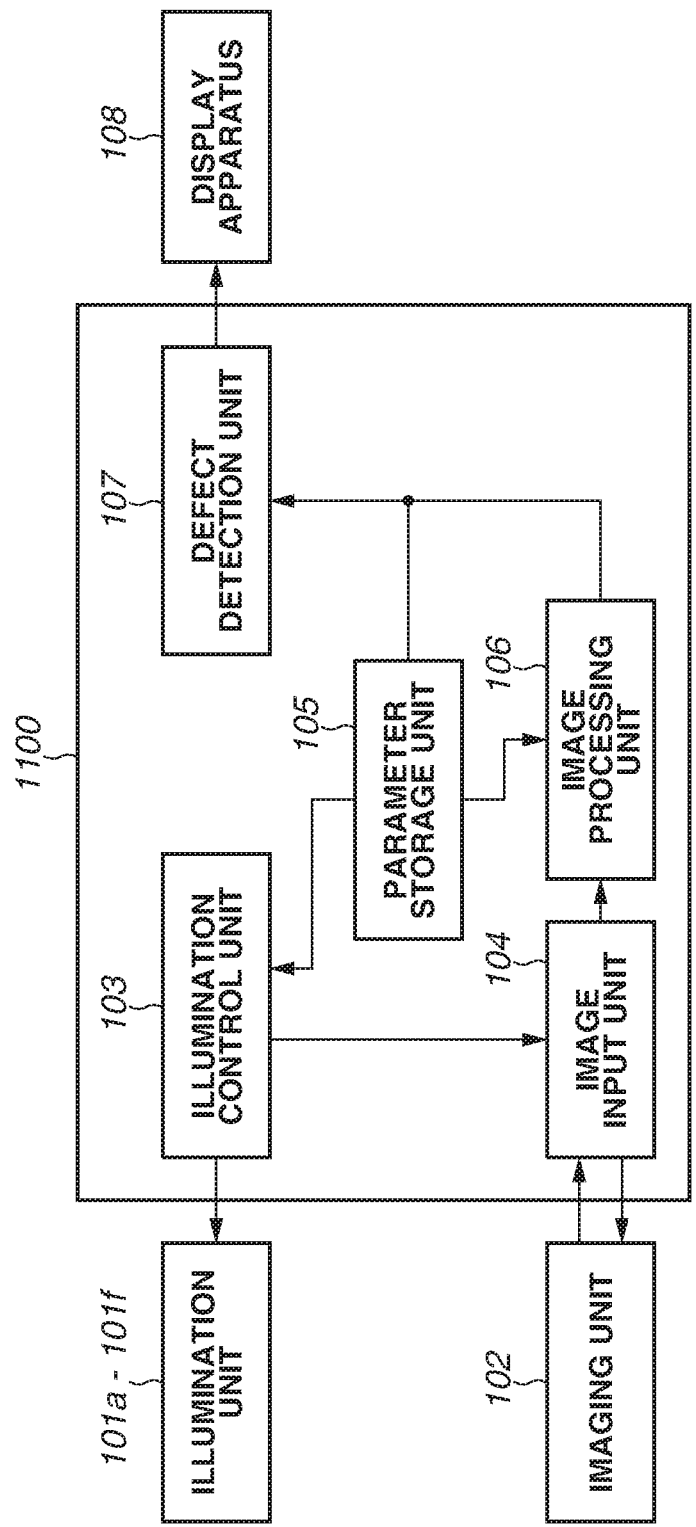
FIG. 1 is a functional block diagram illustrating an information processing apparatus according to a first exemplary embodiment.

FIG. 1 is a block diagram illustrating an example of the configuration of a system using the information processing apparatus 1100 according to the first exemplary embodiment. The information processing apparatus 1100 is connected to illumination units 101a to 101f, an imaging unit 102, and a display apparatus 108.

Figure 2:
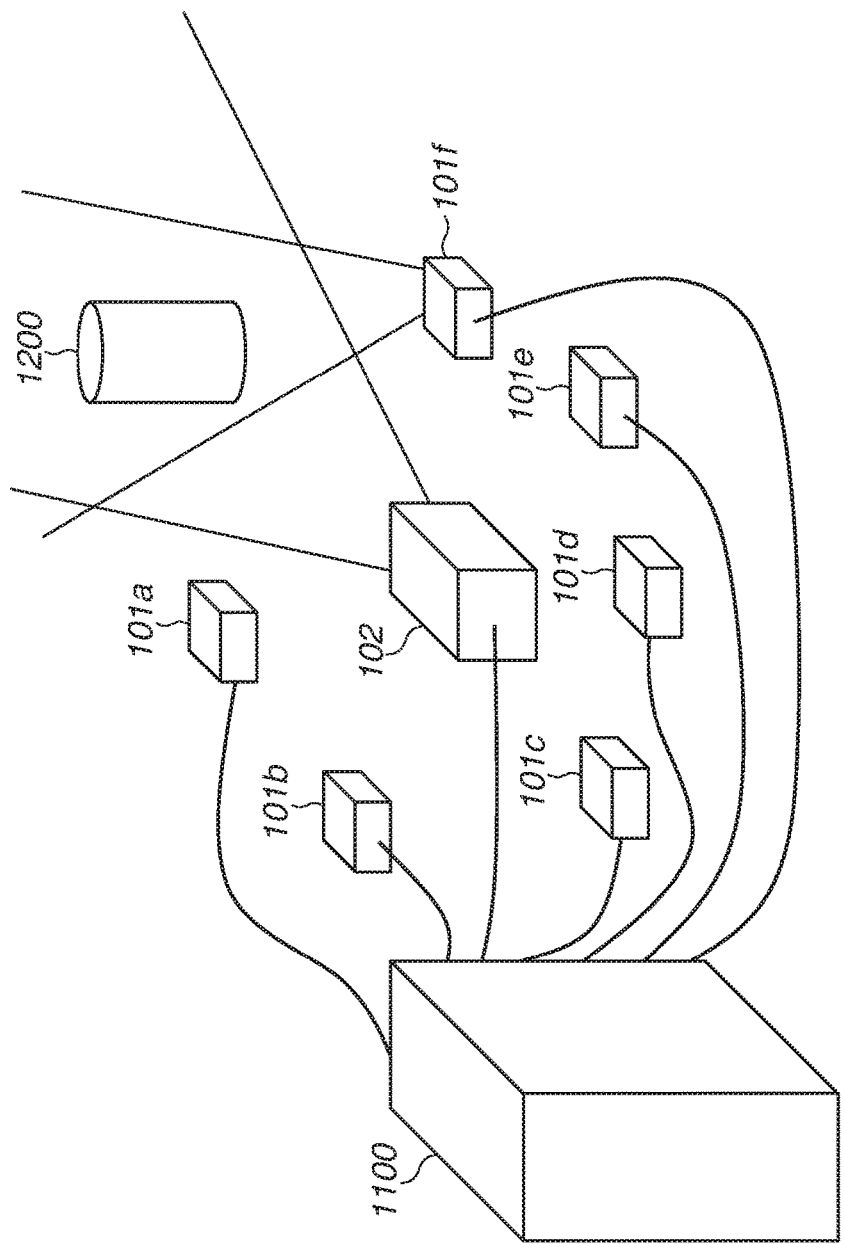
FIG. 2 is a diagram illustrating a general configuration of a system using the information processing apparatus according to the first exemplary embodiment.

As illustrated in a schematic diagram in FIG. 2, the illumination units 101a to 101f are realized by placing a plurality of light-emitting diode (LED) light sources so that a measurement target object 1200 can be illuminated from a plurality of different directions. Every time the illumination state switches, the imaging unit 102 images the measurement target object 1200. A sequence of images captured by the imaging unit 102 is sent to the information processing apparatus 1100. If detecting that the target object 1200 has a defect, the information processing apparatus 1100 classifies the abnormal state of the defect. Further, the information processing apparatus 1100 controls the operations of the illumination units 101a to 101f and the imaging unit 102. At this time, the plurality of illumination units 101a to 101f do not need to have the same brightness and the same color, and various light sources may be mixed together. FIG. 2 illustrates the case where six illumination units (101a to 101f) are used. The number of illumination units, however, is not limited, and any number of illumination units may be used.

Further, it is desirable that these light sources should be placed so that light is incident on the target object 1200 from various directions with little deviation. It is, however, not necessary to exactly calibrate the number of light sources to be placed, the positions of light sources, and the directions of light sources. Further, the illumination units 101a to 101f are not limited to a plurality of light sources. Alternatively, for example, a single light source may be moved to illuminate the measurement target object 1200 to acquire a sequence of images different in illumination direction. Further, not only a general light source such as an LED light source but also an image projected onto a display may be used as a light source.

An illumination control unit 103 performs control to turn on the lights of the plurality of illumination units 101a to 101f one by one in order, to illuminate (irradiate) the target object 1200 from different directions. The illumination control unit 103 may not only perform control to turn on the lights of the illumination units 101a to 101f one by one, but also perform control to simultaneously turn on the lights of more than one of the illumination units 101a to 101f. For example, in a case where it is likely to obtain an image having low luminance when capturing an image, such as a case where the target object 1200 is black, it is desirable to perform control to simultaneously turn on the lights of more than one of the illumination units 101a to 101f.

An image input unit 104 controls the imaging unit 102 to capture an image (imaging control) in time with the timing of control signals input from the illumination control unit 103 and receives the captured images different in the direction of illumination on the target object 1200. Further, the image input unit 104 outputs the captured images to an image processing unit 106.

A parameter storage unit 105 stores the number of the illumination units 101a to 101f and the order of lighting the illumination units 101a to 101f. In performing control, the illumination control unit 103 references parameters for the number and the order. Further, in performing image processing, the image processing unit 106 also references the parameters to generate a luminance profile (described below).

The image processing unit 106 receives the captured images from the image input unit 104, performs image processing required to specify a defect, generates luminance profiles, and sends necessary data to a defect detection unit 107. Further, simultaneously, the image processing unit 106 determines whether the input sequence of captured images is appropriate for specifying a defect. Then, the image processing unit 106 prompts a user to change the imaging environment.

The defect detection unit 107 compares luminance profiles at two pixel positions output from the image processing unit 106 to classify the type of abnormal state.

Based on the classification result of the defect detection unit 107, the display apparatus 108 displays pixels with different colors by the types of abnormalities on a display. The present invention, however, is not limited thereto. Alternatively, the display apparatus 108 may output the pixels to another computer, a server apparatus, an auxiliary storage device, or various recording media, or may involve a specific operation such as moving the target object 1200 based on the type of abnormality.

Each function unit included in the information processing apparatus 1100 is realized by the CPU 1710 loading a program stored in the ROM 1720 into the RAM 1730 and executing processing according to each flowchart described below. Further, for example, to configure hardware as an alternative for a software process using the CPU 1710, a calculation unit and a circuit that correspond to the processing of each function unit may be configured.

[Defect Inspection Process]

Figure 6:
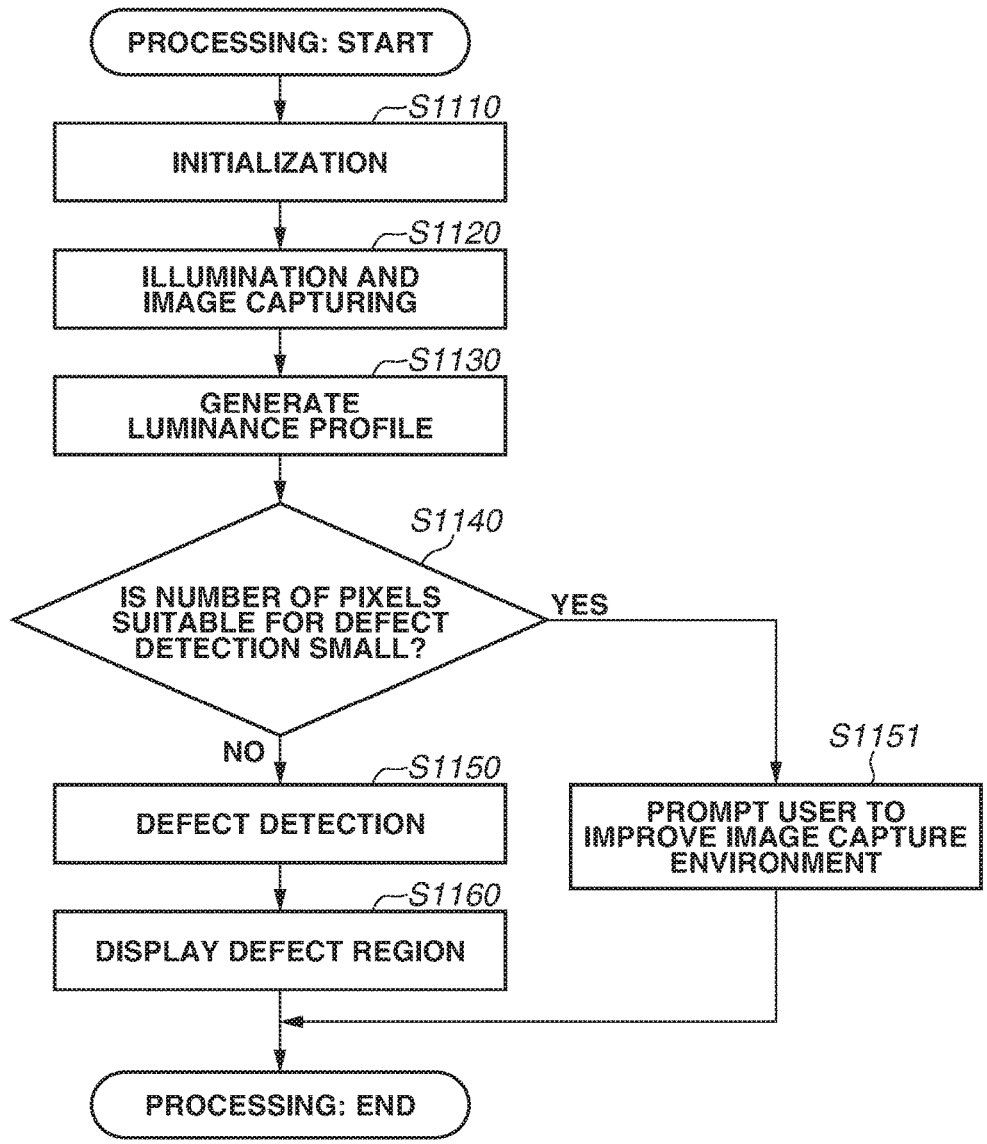
FIG. 6 is a flowchart illustrating processing of the information processing apparatus according to the first exemplary embodiment.

With reference to a flowchart in FIG. 6, the processing of the information processing apparatus 1100 according to the first exemplary embodiment is described.

In step S1110, an initialization process is executed. The initialization process includes the start of the illumination units 101*a* to 101*f* and the imaging unit 102, and the process of reading control parameters for the illumination units 101*a* to 101*f*.

If the initialization is completed, then in step S1120, the illumination control unit 103 turns on the lights of the illumination units 101*a* to 101*f* one by one in order, the illumination units 101*a* to 101*f* placed so that light is shed on the target object 1200 from various directions. The illumination control unit 103 also sends control signals to the image input unit 104. Having received the control signals, the image input unit 104 causes the imaging unit 102 to capture images of the illuminated target object 1200 and sends the captured images (an image group) to the image processing unit 106.

In step S1130, the image processing unit 106 that has received the captured images generates a luminance profile for each pixel (each small region) and generates data of the luminance profile so that a pixel adjacent to the pixel is a comparison target pixel.

Figure 3:
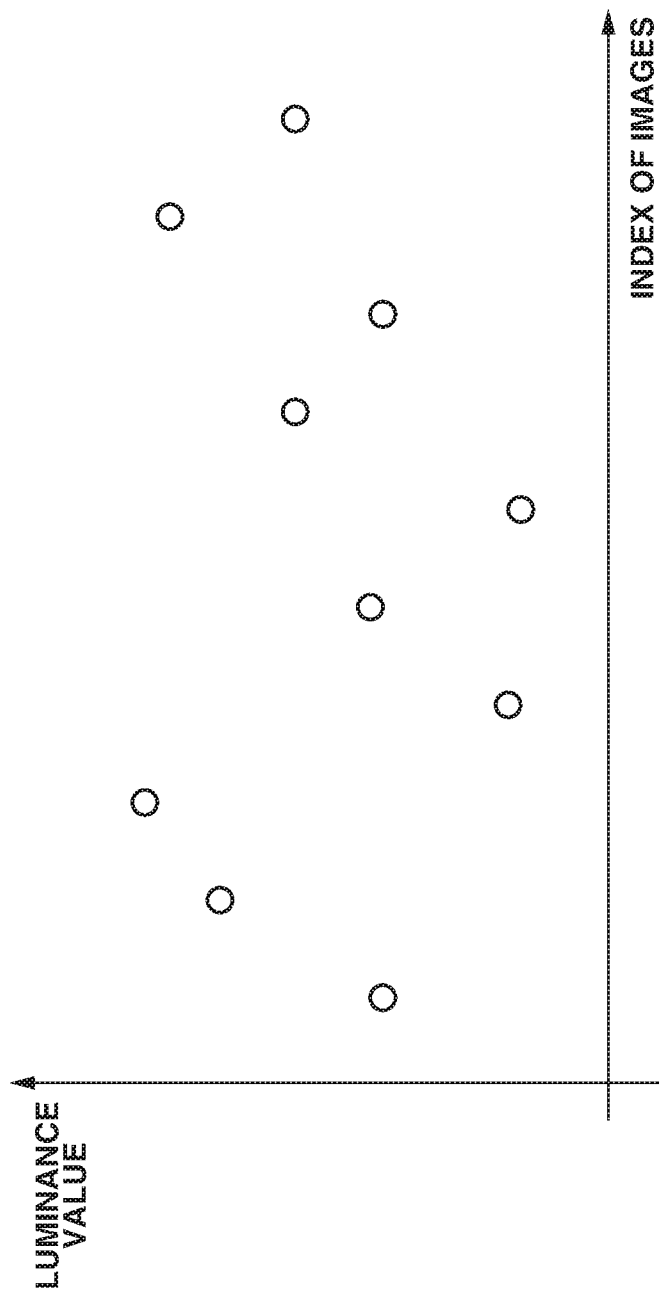
FIG. 3 is a diagram illustrating an example of a luminance profile of a certain pixel.

With reference to a diagram illustrating a luminance profile in FIG. 3, the generation of a luminance profile by the image processing unit 106 is described. A luminance profile is calculated for each pixel. If a sequence of N images is obtained, the luminance profile is represented by an N-dimensional vector in which the luminance values of a time-series sequence of images in the pixel are stored in an N-dimensional array. FIG. 3 illustrates an example of the luminance profile when N=10. The luminance profile, however, may be defined not only in a unit of a single pixel, but also in a unit of a plurality of pixels.

The defect detection unit 107 compares the luminance profiles represented by N-dimensional vectors between two pixels to classify the type of abnormal state as the difference between the two pixels. At this time, the image processing unit 106 defines the combination of two pixels to be compared. It is assumed here that the image processing unit 106 selects the combination of 4-neighbor adjacent pixels. The combination of pixels is not limited to 4-neighbor adjacent pixels. Alternatively, the combination of 8-neighbor adjacent pixels may be selected. Yet alternatively, if pixels to be compared are away from each other, the combination of the pixels away from each other may be selected. Further, the number of pixels to be compared is not limited to two. Alternatively, three or more pixels may be compared.

In step S1140, the image processing unit 106 performs analysis in the luminance profiles and determines whether the number of pixels suitable for defect detection is small. If defect detection is to be performed using a sufficient number of pixels, the image processing unit 106 sends the data generated in step S1130 to the defect detection unit 107, and the processing proceeds to step S1150. The method for determining whether the number of pixels suitable for defect detection is small is performed as follows, for example. The image processing unit 106 performs analysis in the luminance profile of each pixel. If most of the components in the N dimensions have a low value and the luminance can be regarded as being the same, the image processing unit 106 determines that the pixel is hardly illuminated by the illumination units 101*a* to 101*f* and therefore is a pixel not suitable for defect detection. Regarding a pixel not suitable for defect detection, the luminance profile and the combination of pixels are not sent to the defect detection unit 107.

If, on the other hand, the number of pixels suitable for defect detection is small, the processing proceeds to step S1151. In step S1151, the image processing unit 106 instructs and prompts the user to improve the image capture environment, and the processing ends. More specifically, it is considered that the placement of the illumination units 101*a* to 101*f* and the imaging unit 102, an image capture parameter, and the orientation of the target object 1200 are inappropriate. Accordingly, the image processing unit 106 displays an image or text on the display or emits a sound or a voice for giving a warning or an instruction to instruct and prompt the user to improve the image capture environment. Here, the improved image capture environment refers to an image capture environment having placement in which the target object 1200 is frequently illuminated by the illumination units 101*a* to 101*f* so that the luminance value of each component of the luminance profile of each pixel has a relatively large value.

The processing of the image processing unit 106 may be performed on all the pixels. Alternatively, the processing may be performed only on some of the pixels such as pixels in a region specified in advance or pixels in which the target object 1200 obtained by background subtraction is imaged.

Figure 4:
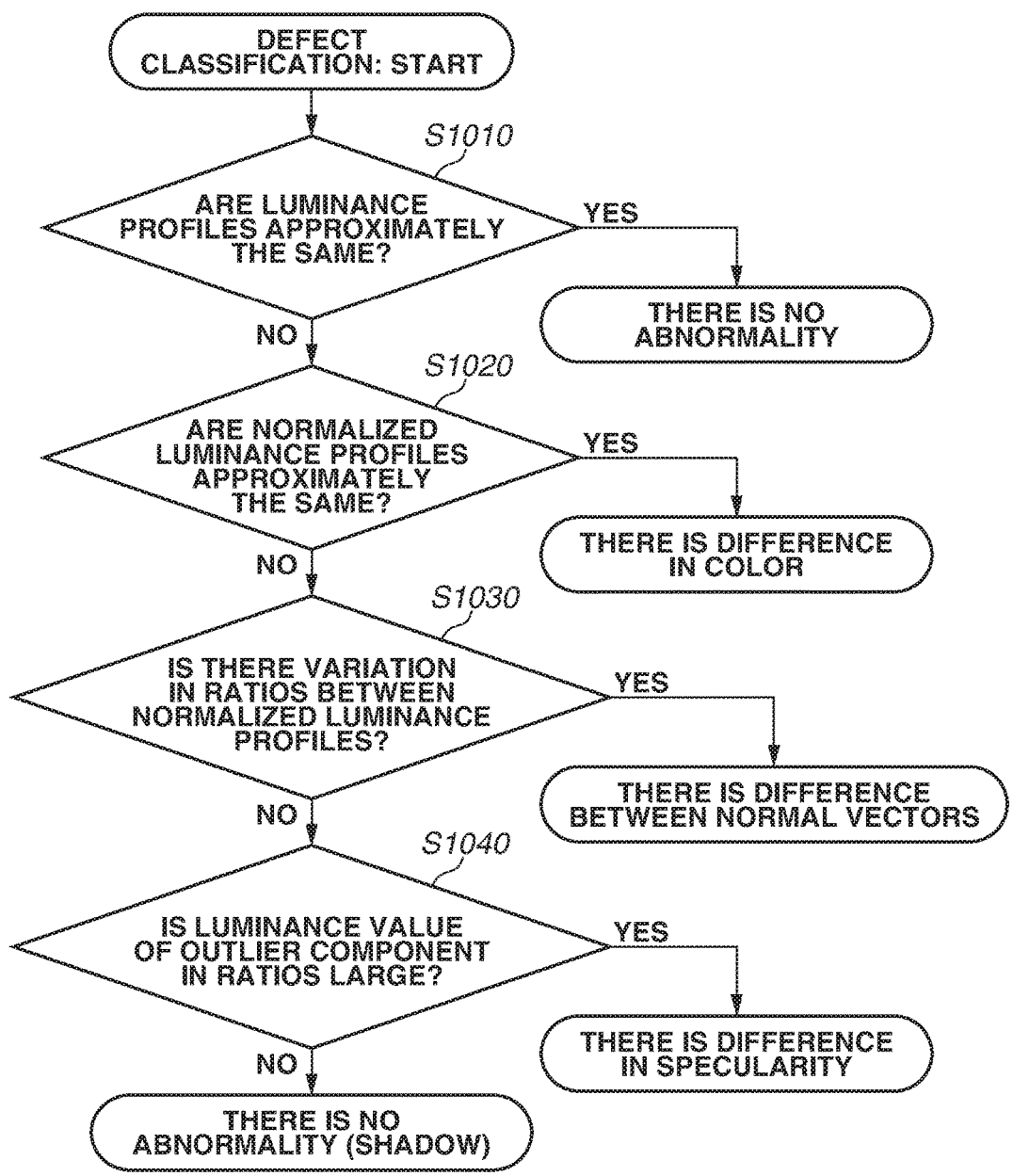
FIG. 4 is a flowchart for performing defect classification in the first exemplary embodiment.

Having received the data of the luminance profiles of the two pixels to be compared, the defect detection unit 107 determines the presence or absence of an abnormal state between the pixels (between the small regions) and classifies the abnormal state, according to a flowchart for performing defect classification (FIG. 4).

With reference to a flowchart for performing defect classification in FIG. 4, the specific processing of the defect detection unit 107 is described.

In step S1010, the defect detection unit 107 calculates, using mathematical formula 1, whether two luminance profiles I1 and I2 are approximately the same.

$$Da = \|I1 - I2\| \qquad \text{Formula 1}$$

where $\|x\|$ represents the absolute value of a vector x. If calculated Da is smaller than a threshold Ta, the defect detection unit 107 ends the classification on the assumption that there is no abnormality. If Da is greater than the threshold Ta, the processing proceeds to step S1020. The threshold Ta is an upper limit where the two luminance profiles I1 and I2 can be regarded as being approximately the same. In this case, the threshold Ta is obtained as, for example, the value of 5% of the luminance standard deviation of the entirety of I1 and I2.

In step S1020, the defect detection unit 107 normalizes the N-dimensional vectors of the two luminance profiles I1 and I2 and compares the normalized luminance profiles I1 and I2. If each luminance profile is I and each normalized luminance profile is J, J is calculated using mathematical formula 2 as follows.

$$J = (I - \bar{I})/\sqrt{\sigma} \qquad \text{Formula 2}$$

where $\bar{I}$ and $\sigma$ represent the mean and the variance of the N-dimensional vector I, respectively. Using J1 and J2 obtained by mathematical formula 2, a difference Db between J1 and J2 is obtained in a manner similar to mathematical formula 1. If Db is smaller than a threshold Tb, the defect detection unit 107 determines that the normalized luminance profiles J1 and J2 are approximately the same, and classifies this state such that there is a difference in color between the two pixels. Further, if Db is greater than the threshold Tb, the processing proceeds to step S1030. The threshold Tb is an upper limit where the two normalized luminance profiles J1 and J2 can be regarded as being the same. In this case, the threshold Tb is obtained as, for example, the value of 5% of the luminance standard deviation of the entirety of J1 and J2. The method for normalization, however, is not limited to the calculation to obtain a mean of 0 and a variance of 1 as indicated in mathematical formula 2. Further, in this case, the value of the threshold Tb is also set to 5%. The present invention, however, is not limited thereto. Alternatively, the value of the threshold Tb may be another value.

In step S1030, the defect detection unit 107 obtains the ratios between the components of the normalized luminance profiles J1 and J2 and evaluates the proportions of components the ratios between which can be regarded as being constant. If there are few components the ratios between which can be regarded as being the same, and there is a variation in the ratios, the defect detection unit 107 classifies this state such that there is a difference between normal vectors. The normal vector refers to the direction of the surface of the target object 1200. If there is a difference between the normal vectors between adjacent pixels, it is considered that there is a change in the shape at the adjacent pixels. Further, if it is possible to regard the ratios between the components as being the same except for a very small number of outlier components, the processing proceeds to step S1040. If a small number of outliers are not present, and the ratios between the components are constant, it is not necessary to classify this state. This is because this case is classified such that "there is no abnormality" in step S1010 or "there is a difference in color" in step S1020.

Figure 5:
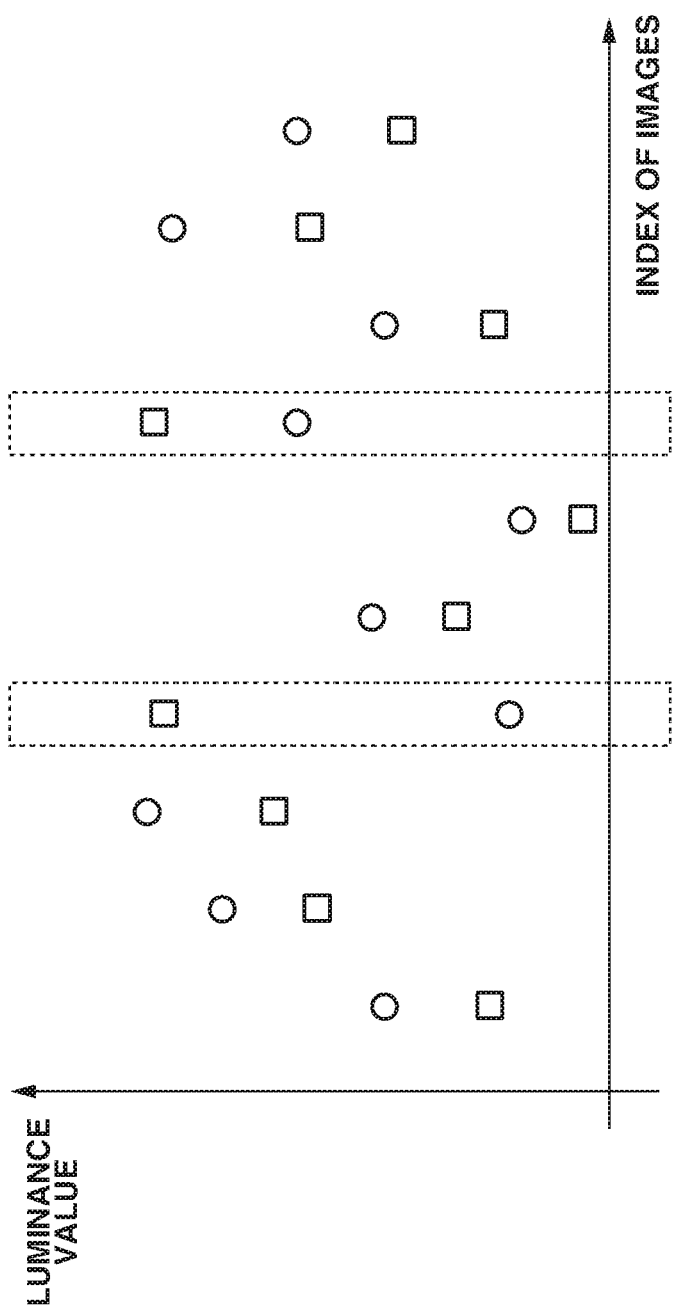
FIG. 5 is a diagram illustrating an example of a luminance profile in a case where ratios between components except for a small number of outliers are approximately constant.

In step S1040, the defect detection unit 107 compares the very small number of components removed as outliers in step S1030 with another component in the same luminance profile. FIG. 5 illustrates an example of a luminance profile in a case where the ratios between components except for a small number of outliers are approximately constant. In this graph, and "o" and "□" represent luminance profiles at different pixel positions. The example of the graph indicates that in the luminance profiles represented by 10-dimensional vectors, the ratios between only two pairs of components surrounded by rectangles indicated by dotted lines are significantly different from the ratios between the other components, and these two pairs of components are determined as outliers. If either of the pixels having the outlier component has a luminance value greater than those of the other component in the same luminance profile (for example, the pixel of "□" in the components surrounded by the dotted lines in FIG. 5), it is considered that a highlight occurs due to the gloss of the surface of the target object 1200.

On the other hand, a comparison target adjacent pixel regarding these components (for example, the pixel of "o" in the components surrounded by the dotted lines in FIG. 5) has a low luminance value. Accordingly, it is considered that a highlight does not occur in the comparison target adjacent pixel. These pixels therefore can be regarded as being different in specularity. Further, similarly, if either of the pixels having the outlier components has a luminance value smaller than those of the other components, it is considered that in the illumination direction corresponding to these components, a shadow occurs due to a shielding object. On the other hand, the comparison target adjacent pixel regarding these components has a high luminance value, and a shadow does not occur in the comparison target adjacent pixel. Accordingly, it can be considered that a boundary caused by the shadow occurs between these pixels. This is not an abnormality in the target object 1200, but occurs due to the measurement environment. It is therefore possible to classify this state such that there is no abnormality.

As described above, the defect detection unit 107 classifies the type of abnormal state and outputs the result of the classification to the display apparatus 108. With reference to FIG. 4, an example has been illustrated where an abnormal state is classified into three types of abnormal states in order. The present invention, however, is not limited thereto. Alternatively, only a particular abnormal state may be detected, or an abnormal state may be classified in different order. Further, in the present exemplary embodiment, for ease of description, the image processing unit 106 and the defect detection unit 107 are distinguished and treated as different units. The present invention, however, is not limited thereto. Alternatively, either of the image processing unit 106 and the defect detection unit 107 may double as the other.

This process is performed between all the pixels to be inspected. At this time, pairs of pixels may be processed one by one, or a plurality of pairs of pixels may be processed in parallel. Then, the defect detection unit 107 sends the result of the classification to the display apparatus 108.

In step S1160, the display apparatus 108 that has received the result displays the result on the display according to the abnormal state.

With the above configuration, luminance profiles are generated based on the luminance values (luminance information) of a sequence of images captured while a plurality of light sources are turned on and off with respect to a target object, and the luminance profiles of pixels are compared according to the influence of an abnormal state on luminance, so that it is possible to determine the presence or absence of an abnormal state and classify the abnormal state into three types of abnormal states such as a shape defect, a hue defect, and a gloss defect without using prior learning or a database. Further, it is also possible, according to the classification, to distinguish the influence of a shadow or a highlight occurring on the surface of the target object. Further, in the present apparatus configuration, it is not necessary to exactly calibrate the brightness, the color, and the placement of a light source. Accordingly, it is easy to set up the apparatus.

A second exemplary embodiment of the present invention is described below. In the second exemplary embodiment, unnecessary processing is omitted using knowledge about a target object, to perform the processing of the first exemplary embodiment faster. Further, based on knowledge about a target object, a classified abnormal state is classified into finer states, and it is determined whether there is a problem with the abnormal state.

[Configuration of Apparatus]

Figure 7:
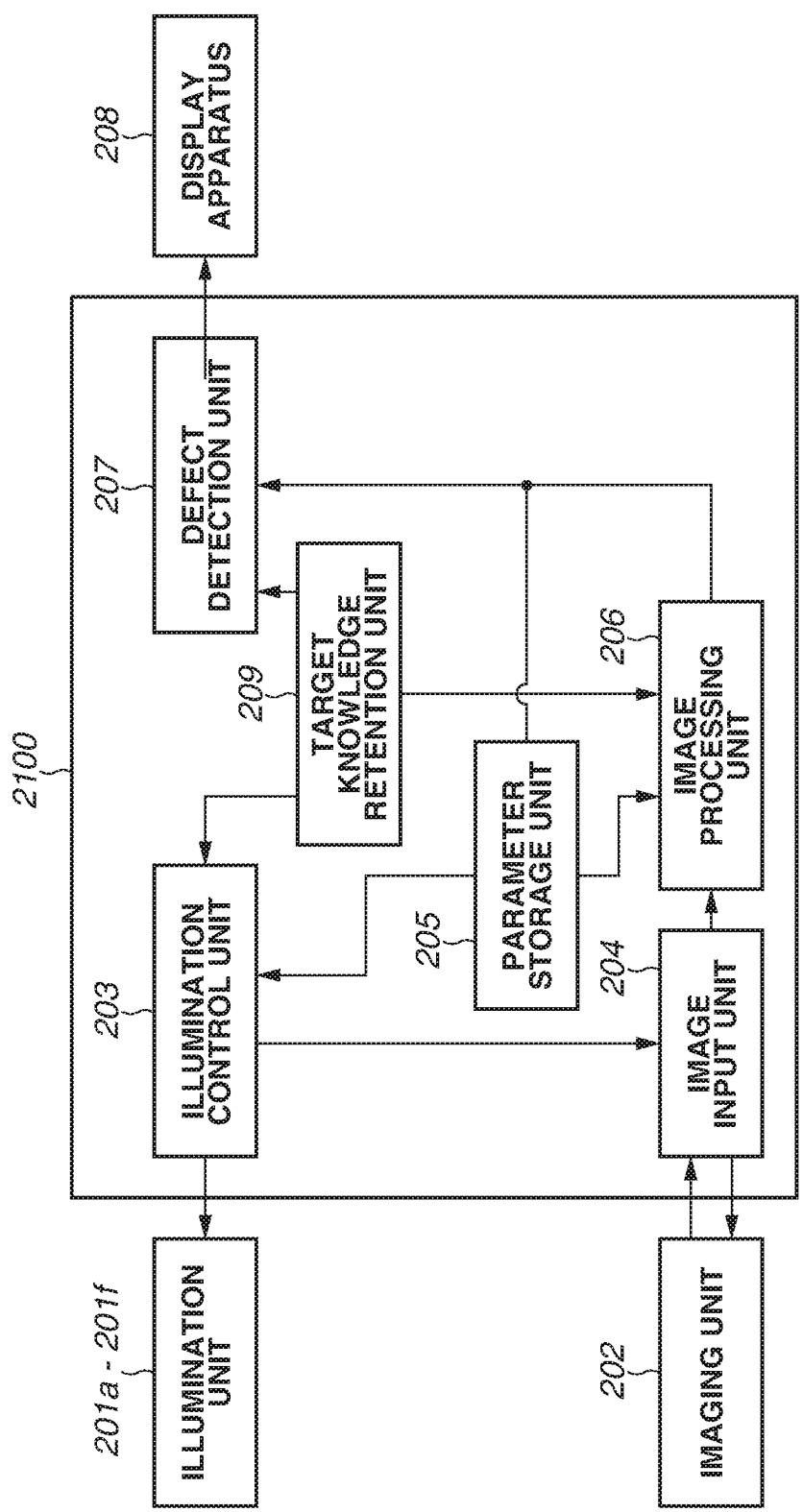
FIG. 7 is a functional block diagram of an information processing apparatus according to a second exemplary embodiment.

With reference to a block diagram in FIG. 7, a description is given of a system using an information processing apparatus 2100 according to the second exemplary embodiment of the present invention. In the second exemplary embodiment, some parts of the configuration in FIG. 1 are changed. In FIG. 7, components 2100, 2200, 201a to 201f, 202, 204, 205, and 208 are similar to the components 1100, 1200, 101a to 101f, 102, 104, 105, and 108, respectively, in the first exemplary embodiment and perform similar operations. Accordingly, only components 203, 206, 207, and 209, which are different from the first exemplary embodiment, are described here.

A target knowledge retention unit 209 retains knowledge about a target object 2200 and outputs the knowledge about the target object 2200 to an illumination control unit 203, an image processing unit 206, and a defect detection unit 207. The knowledge about the target object 2200 is information including, for example, information about a region to be inspected in the target object 2200, texture information, and geometric information such as information about a main normal direction, information about regions that can be regarded as having the same normal direction, and edge information. In the present exemplary embodiment, a case is described where the target knowledge retention unit 209 retains the above five pieces of knowledge about the target object 2200. The present invention, however, is not limited thereto. Alternatively, these pieces of knowledge may be input as data to the target knowledge retention unit 209 in advance. Yet alternatively, these pieces of knowledge may be accumulated as knowledge while defect inspection is performed. Yet alternatively, a mechanism where the user updates knowledge as necessary may be included, or knowledge may be acquired by another measurement apparatus such as a shape measurement apparatus. Then, these pieces of knowledge are sent to the illumination control unit 203, the image processing unit 206, and the defect detection unit 207.

The illumination control unit 203 receives information about a region to be inspected and the main normal direction from the target knowledge retention unit 209 and then changes the placement of the light source directions of illumination units 201a to 201f. More specifically, the illumination control unit 203 changes the placement of the light source directions so that a region to be inspected is illuminated by light from as various incidence directions as possible. Alternatively, it is desirable that the light sources should be placed without deviation in hemispherical directions the zenith of which is the main normal direction. Such placement enables defect inspection with more accuracy.

The image processing unit 206 receives, from the target knowledge retention unit 209, information about a region to be inspected and regions that can be regarded as having the same normal direction, and edge information, and then limits pixels for which luminance profiles are to be obtained, and the combination of pixels to be compared in a defect detection process.

More specifically, if a region to be inspected is known, the image processing unit 206 generates luminance profiles only for pixels corresponding to the region and generates data so that defect detection is performed only in pixels adjacent to the group of pixels. Then, the image processing unit 206 sends the data to the defect detection unit 207.

Further, if regions that can be regarded as having the same normal direction are known, the image processing unit 206 excludes the regions from pairs of pixels to be subjected to defect detection in a boundary region between the same normal direction and a different normal direction. Then, the image processing unit 206 generates data so that a group of pixels in the regions having the same normal direction is collectively compared. Then, the image processing unit 206 sends the data to the defect detection unit 207.

If edge information is known, it is known that a difference between normal vectors will be detected in a pixel corresponding to an edge of a shape when defect detection is performed. Accordingly, the image processing unit 206 excludes the pixel from pairs of pixels to be subjected to defect detection. Then, the image processing unit 206 generates data and sends the data to the defect detection unit 207. In the above manner, the image processing unit 206 can omit lengthy processing in the defect detection process and speed up processing.

The defect detection unit 207 receives texture information and edge information from the target knowledge retention unit 209, classifies an abnormal state according to the flowchart in FIG. 4 in a manner similar to the first exemplary embodiment, and then determines whether there is a problem with the abnormal state. The details will be described below.

The other operations are similar to those in the first exemplary embodiment and therefore are not described here.

[Defect Inspection Process]

Figure 8:
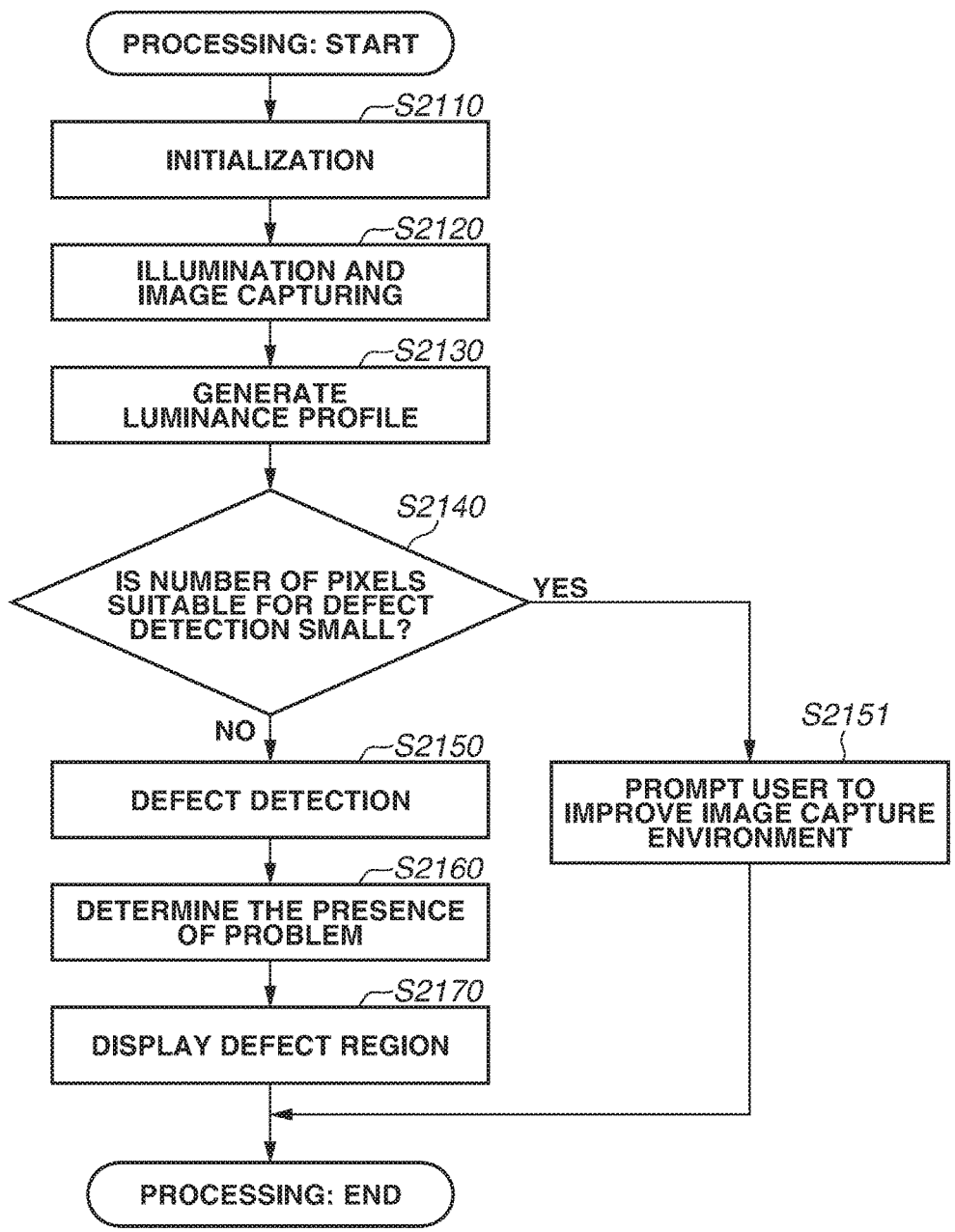
FIG. 8 is a flowchart illustrating processing of the information processing apparatus according to the second exemplary embodiment.

With reference to a flowchart in FIG. 8, a defect inspection process by the information processing apparatus 2100 according to the second exemplary embodiment is described.

In step S2110, an initialization process is executed. The initialization process includes the start of the illumination units 201a to 201f and an imaging unit 202, the process of reading control parameters for the illumination units 201a to 201f, and the process of loading knowledge into the target knowledge retention unit 209.

When the initialization is completed, then in step S2120, the illumination control unit 203 sets the placement of the illumination units 201a to 201f based on information from the target knowledge retention unit 209 and turn on the lights of the illumination units 201a to 201f one by one in order so that light is shed on the target object 2200 from various directions. The illumination control unit 203 also sends control signals to an image input unit 204. The image input unit 204 that has received the control signals causes the imaging unit 202 to capture images of the illuminated target object 2200 and sends the captured images to the image processing unit 206.

In step S2130, the image processing unit 206 that has received the captured images generates a necessary luminance profile for each pixel based on information from the target knowledge retention unit 209 and generates data of the luminance profile together with the combination of comparison target pixels.

In step S2140, the image processing unit 206 analyzes the luminance profiles and determines whether the number of pixels suitable for defect detection is large. If defect detection is to be performed using a sufficient number of pixels, the image processing unit 206 sends the data generated in S2130 to the defect detection unit 207, and the processing proceeds to step S2150. If, on the other hand, the number of pixels suitable for defect detection is small, the processing proceeds to step S2151. In step S2151, the image processing unit 206 instructs and prompts the user to improve the image capture environment, and the processing ends.

Having received the data of the luminance profiles of the pixels to be compared, then in step S2150, the defect detection unit 207 determines the presence or absence of an abnormal state between the pixels according to the above flowchart for performing defect classification (FIG. 4) and classifies the abnormal state. In the present exemplary embodiment, the defect detection unit 207 classifies the abnormal state according to the flowchart in FIG. 4 in a manner similar to the first exemplary embodiment and then determines whether there is a problem with the abnormal state.

More specifically, if texture information is known, and if the abnormal state is classified such that there is a difference in color between the pair of pixels, the defect detection unit 207 checks the texture information against corresponding texture information. Then, if there is a change in the reflectance in the texture information, a difference in color should occur in the pixels. Thus, the defect detection unit 207 determines that there is no problem. If, on the other hand, there is no change in the reflectance in the texture information, a difference in color is an unexpected change in color due to the inclusion of foreign matter or coating unevenness. Accordingly, the defect detection unit 207 determines that there is a problem.

Similarly, also if edge information is known, and if the abnormal state is classified such that there is a difference between normal vectors, the defect detection unit 207 checks the edge information against corresponding edge information. Then, if an edge in the edge information is present in the pixels, the difference between the normal vectors should occur in the pixels. Accordingly, the defect detection unit 207 determines that there is no problem. If, on the other hand, an edge in the edge information is not present in the pixels, the difference between the normal vectors is a depression or a protrusion due to a scratch on the surface of the target object 2200. Accordingly, the defect detection unit 207 determines that there is a problem.

In step S2160, based on information from the target knowledge retention unit 209, the defect detection unit 207 determines whether the abnormal state is an abnormality to be treated as a problem in the state of being classified as an abnormality. Then, the defect detection unit 207 sends to a display apparatus 208 the result of determining that the abnormal state is an abnormality, and there is also a problem with the abnormal state.

Receiving the result, then in step S2170, the display apparatus 208 displays the result on the display according to the abnormal state.

With the above configuration, it is possible, using information about a target object, to classify an abnormal state at high speed and further determine whether there is a problem with the classified abnormal state.

A third exemplary embodiment of the present invention is described below. In the third exemplary embodiment, while a target object is conveyed using a conveyor belt, an abnormal state is simultaneously classified to sort the target object. While the target object is conveyed using the conveyor belt, a relative position and an orientation of the target object with respect to the surrounding light source environment change, and therefore, the illumination direction changes. As a result, it is possible to classify the abnormal state of the target object using this change in the light source as in the first exemplary embodiment.

[Configuration of Apparatus]

Figure 9:
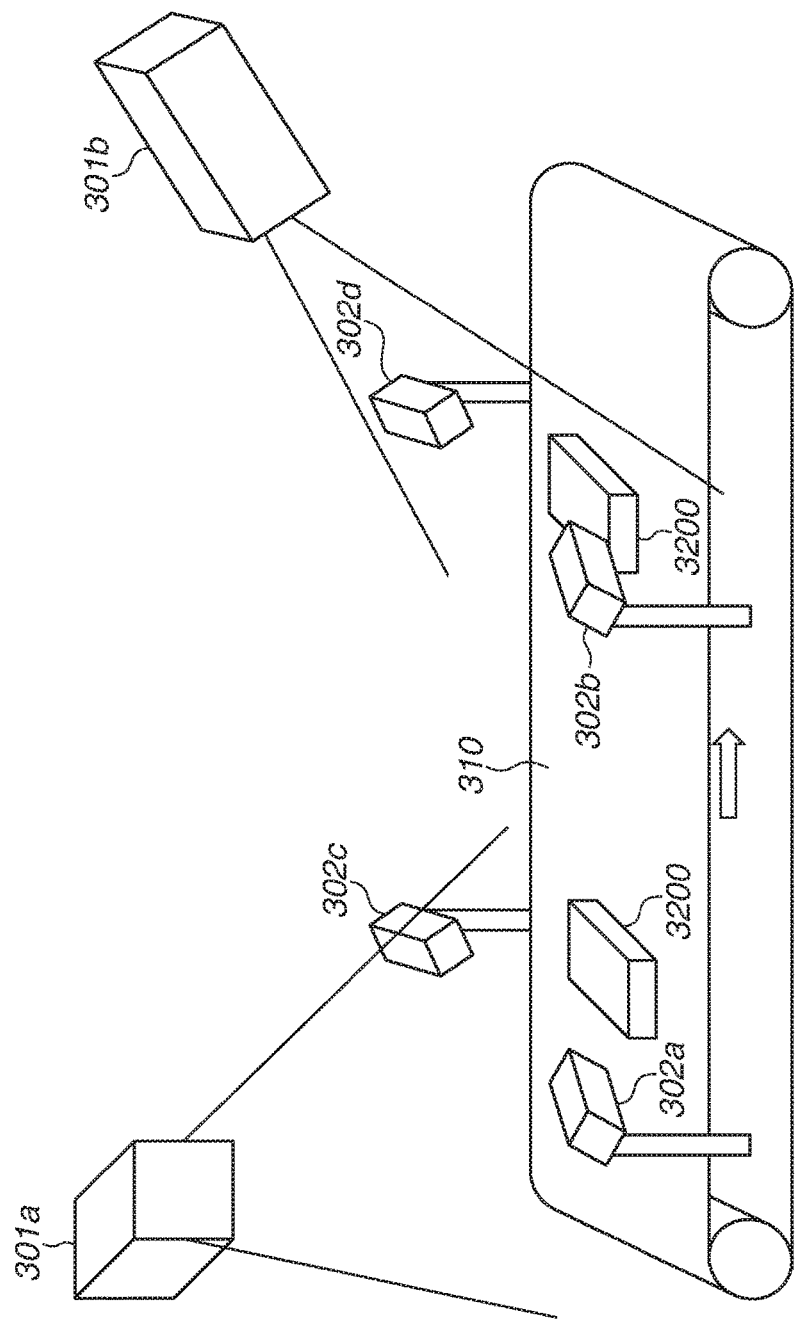
FIG. 9 is a diagram illustrating an example of a general configuration of a system using an information processing apparatus according to a third exemplary embodiment.
Figure 10:
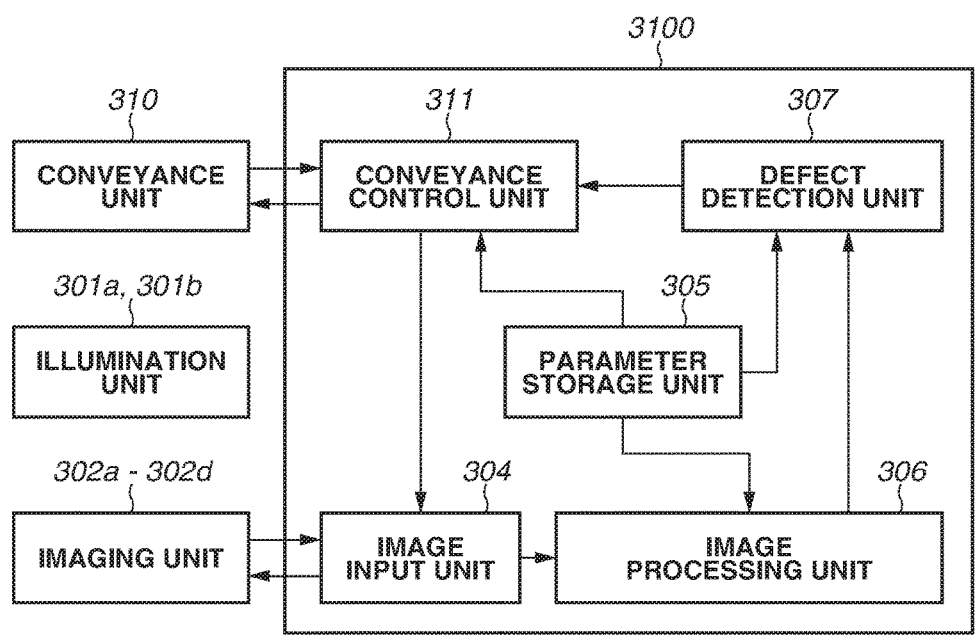
FIG. 10 is a functional block diagram of the information processing apparatus according to the third exemplary embodiment.

With reference to a schematic diagram in FIG. 9 and a block diagram in FIG. 10, a description is given of a system using an information processing apparatus 3100 according to the third exemplary embodiment of the present invention. A technique for performing defect inspection according to the third exemplary embodiment has many portions similar to those of the first and second exemplary embodiments. In FIGS. 9 and 10, components 304, 307, 3100, and 3200 are similar to the components 104, 107, 1100, and 1200, respectively, in the first exemplary embodiment and perform similar operations. Thus, only components 301, 302, 303, 305, 306, 310, and 311, which are different from the first exemplary embodiment, are described in detail below.

A conveyance unit 310 is a conveyor belt and conveys a target object 3200.

A conveyance control unit 311 controls the conveyance speed and the conveyance destination of the conveyance unit 310. Further, the conveyance control unit 311 sends control signals to an image input unit 304 so that the image input unit 304 can synchronize with the conveyance speed, and imaging units 302a to 302d can capture images at the timing when the target object 3200 arrives.

The imaging units 302a to 302d image the target object 3200 arriving on the conveyance unit 310 at the timing when the control signals are sent to the image input unit 304.

A parameter storage unit 305 stores the conveyance speed of the conveyance unit 310, the timing when the target object 3200 arrives, and the number and groups of the imaging units 302a to 302d.

An image processing unit 306 receives a sequence of images from the image input unit 304 and performs positioning so that the target object 3200 is at the same pixel position in each group of images captured from the same direction. The processing after the sequence of images in which the correspondences between pixel positions are found is obtained and the processes of a defect detection unit 307 are similar to those in the first exemplary embodiment and therefore are not described.

The defect detection unit 307 sends a classification result to the conveyance control unit 311, and the conveyance control unit 311 changes the conveyance destination of the conveyance unit 310 according to the presence or absence of a classified abnormality and the type of abnormality. For example, the target object 3200 having an abnormality is unnecessary and therefore is conveyed to a discarding box. The present invention, however, is not limited to thereto. Alternatively, if the number of abnormalities is small, and it is difficult to determine whether abnormalities are a defect, the defect detection unit 307 may notify the user of the situation by a display or a sound to prompt the user to perform a final check by human eyes.

Illumination units 301a and 301b are light sources fixed to the conveyance unit 310. Specifically, the illumination units 301a and 301b are fluorescent lights that continue to perform illumination with a constant brightness, or sunlight streaming through a window. The present invention, however, is not limited to thereto. Alternatively, the illumination units 301a and 301b may only need to be light sources having deviation in the illumination direction with respect to the target object 3200 moving on the conveyance unit 310. FIG. 10 illustrates the case where the number of the illumination units 301a and 301b is two. The present invention, however, is not limited thereto.

The details of the imaging units 302a to 302d will be described below. The imaging units 302a to 302d form groups including a plurality of cameras. Cameras in the same group are fixedly attached to the conveyance unit 310 while a certain distance is maintained from the belt portion so that the cameras can image in the same orientation the target object 3200 arriving. By imaging the target object 3200 in synchronization with the conveyance speed of the conveyance unit 310, it is possible to image the target object 3200 with the relative positional relationships between the imaging units 302a to 302d and the target object 3200 remaining fixed, even if images are captured at different positions by the plurality of imaging units 302a to 302d. However, not all the imaging units 302a to 302d need to capture the target object 3200 from the same direction, and the imaging units 302a to 302d may be placed to form a plurality of groups for capturing the target object 3200 from the same direction. The positions of the target object 3200 in the sequence of captured images, however, may shift to some extent depending on the conveyance path. In this case, the image processing unit 306 may perform positioning by performing conversion such as translating the images, so that the correspondences between the positions of the target object 3200 can be found at the same pixel in the sequence of images captured by the imaging units 302*a* to 302*d* in the same group.

Further, in the present exemplary embodiment, a description has been given on the assumption that the imaging units 302*a* to 302*d* are fixedly attached to the conveyance unit 310. The present invention, however, is not limited thereto. Alternatively, the imaging units 302*a* to 302*d* may be moved while maintaining the relative positional relationships between the imaging units 302*a* to 302*d* and the target object 3200 by placement on the belt or by another movement unit, thereby finding the correspondences in the sequence of images. Further, FIG. 10 illustrates the case where the number of the imaging units 302*a* to 302*d* is four. However, the number is not limited thereto.

Figure 12:
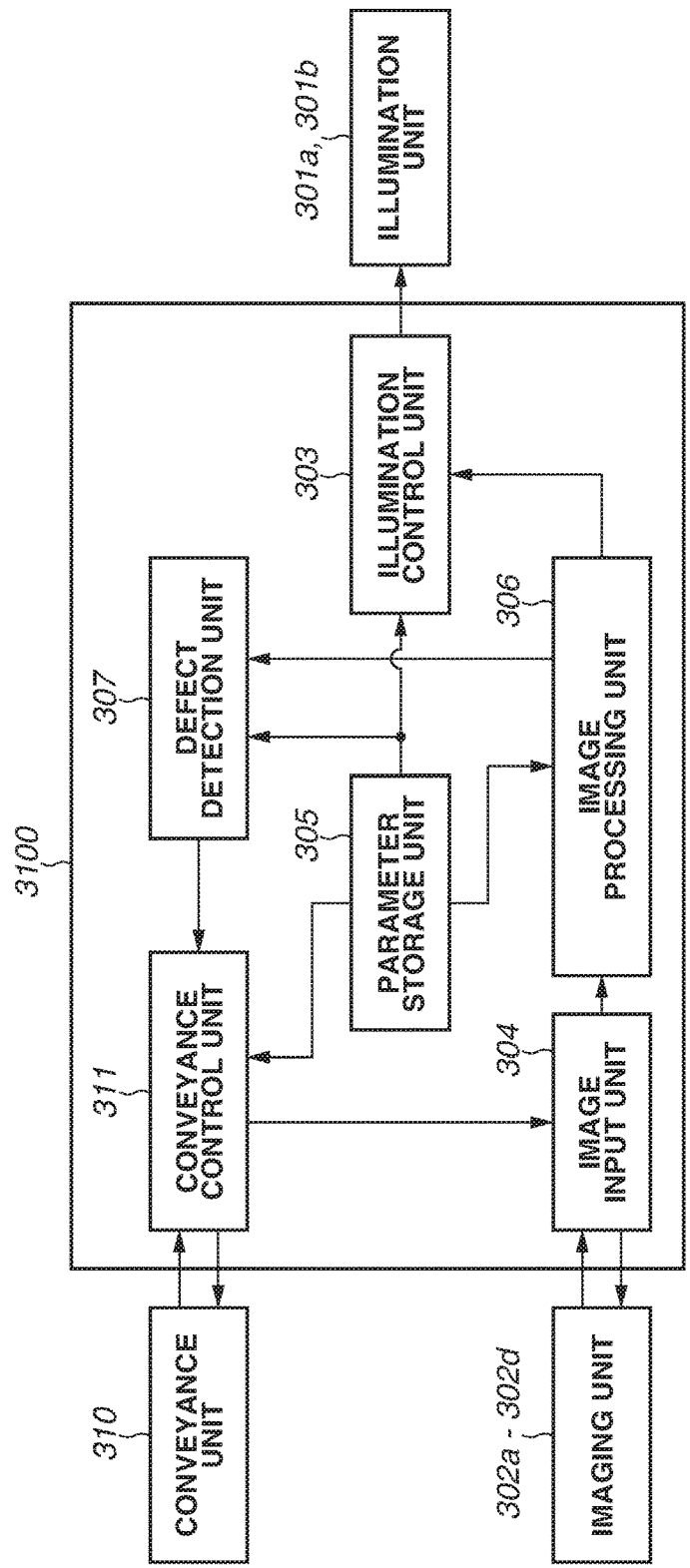
FIG. 12 is a functional block diagram of an information processing apparatus according to the third exemplary embodiment.

Further, the illumination units 301*a* and 301*b* are not limited to light sources that continue to perform illumination at a constant brightness without requiring control. Alternatively, as illustrated in a general configuration in FIG. 13, the illumination units 301*a* and 301*b* may be placed around the conveyance unit 310, and illumination may be controlled. FIG. 12 illustrates a block diagram in this case. Since this block diagram is almost similar to that in FIG. 10, similar blocks are not described here, and only an illumination control unit 303, which is newly added, is described. The illumination control unit 303 receives, from the parameter storage unit 305, information about the conveyance speed and the timing when the target object 3200 arrives, and lights and extinguishes the illumination units 301*a* and 301*b* in a timely manner to change the direction of illumination on the moving target object 3200 to perform illumination. Further, the imaging units 302*a* to 302*d* images the target object 3200 at the timing when the illumination units 301*a* and 301*b* bring the target object 3200 into different illumination states.

[Defect Inspection/Conveyance Process]

Figure 11:
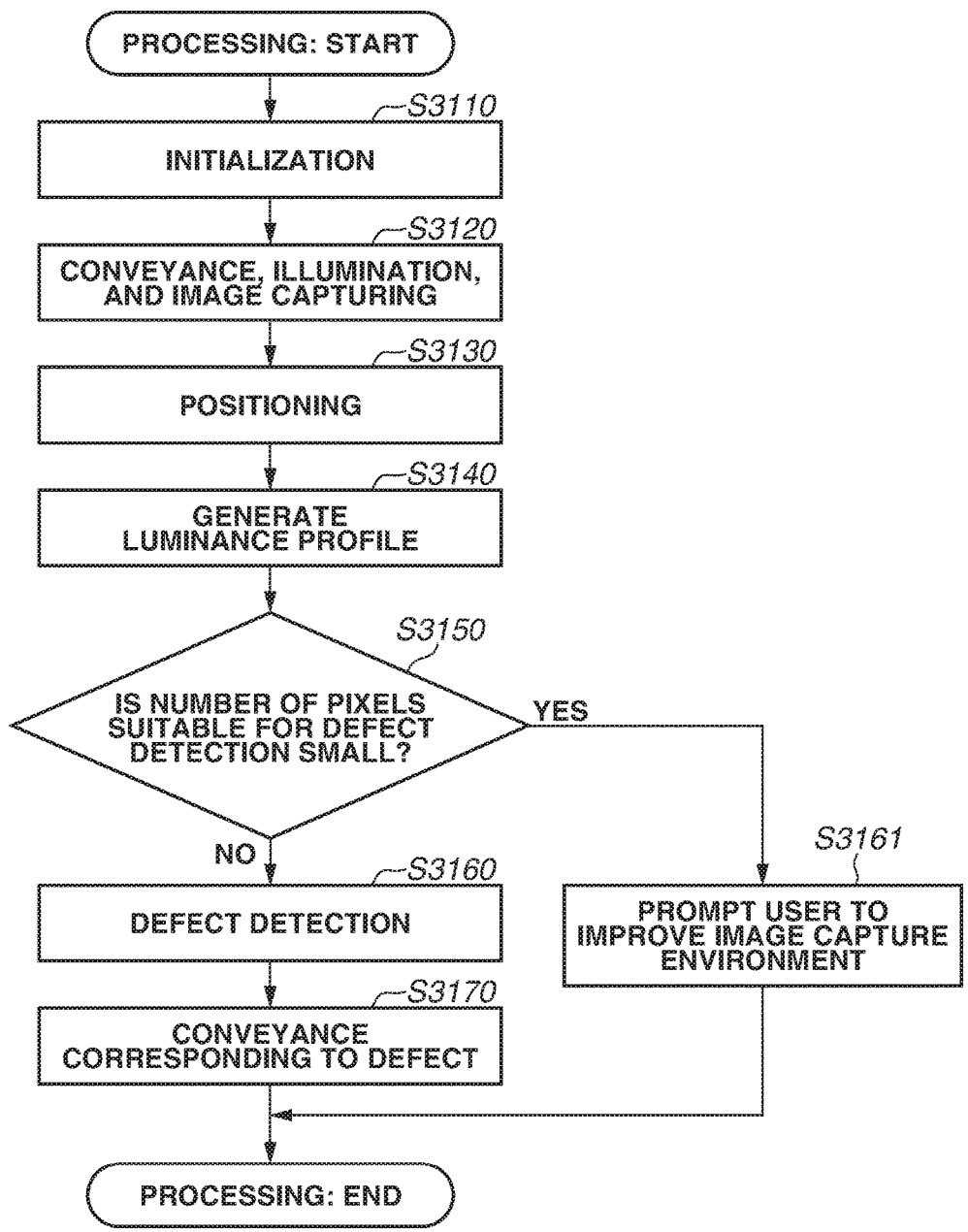
FIG. 11 is a flowchart illustrating processing of the information processing apparatus according to the third exemplary embodiment.

With reference to a flowchart in FIG. 11, a description is given of the flow of the processing of the system using the information processing apparatus 3100 according to the third exemplary embodiment.

In step S3110, an initialization process is executed. The initialization process includes the placement and the start of the imaging units 302*a* to 302*d*, the start of the conveyance unit 310, and the process of reading control parameters, such as the conveyance speed and the number of images to be captured, from the parameter storage unit 305.

When the initialization is completed, then in step S3120, the target object 3200 is conveyed by the conveyance unit 310. The imaging units 302*a* to 302*d* image the conveyed target object 3200 in synchronization with the conveyance speed so that imaging units in the same group among the imaging units 302*a* to 302*d* can image the conveyed target object 3200 in the same orientation. Further, in the case of the block diagram in FIG. 12, the illumination control unit 303 switches the lighting and the extinction of the illumination units 301*a* and 301*b* where necessary. The obtained captured images are sent to the image processing unit 306.

In step S3130, the image processing unit 306 that has received the captured images performs positioning to find the correspondences between pixel positions at which the target object 3200 appears.

The processes of steps S3140 to S3160 are similar to the processes of steps S1130 to S1150 in FIG. 6 (the first exemplary embodiment) and therefore are not described herein.

If the presence or absence of an abnormality and the type of defect are determined in the target object 3200, then in step S3170, the conveyance unit 310 changes the conveyance destination based on the type of defect.

With the above described configuration, when a target object is conveyed, the state of a change in the illumination of a surrounding light source on the target object by the conveyance is imaged, and defect detection is performed as in the first exemplary embodiment, so that it is possible to determine the presence or absence of an abnormal state and the type of defect simultaneously with the conveyance and sort the target object by changing the conveyance destination based on the results of the determinations.

A forth exemplary embodiment of the present invention will be described below. In the fourth exemplary embodiment, using a change in the relative light source environment of a surrounding light source with respect to a target object when a robot arm moves the target object by holding the target object, the abnormal state of the target object is classified simultaneously with the holding movement, and the target object is sorted, as in the third exemplary embodiment.

[Configuration of Apparatus]

Figure 14:
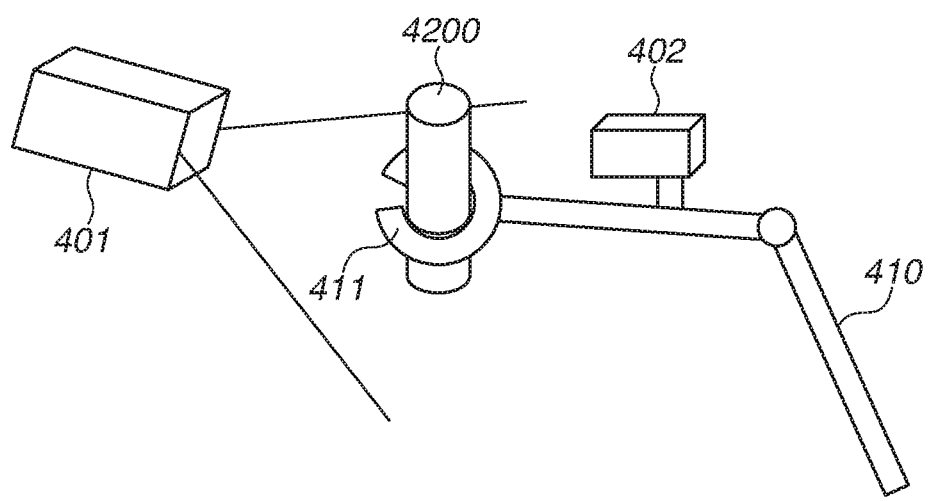
FIG. 14 is a diagram illustrating an example of a general configuration of a system using an information processing apparatus according to a fourth exemplary embodiment.
Figure 15:
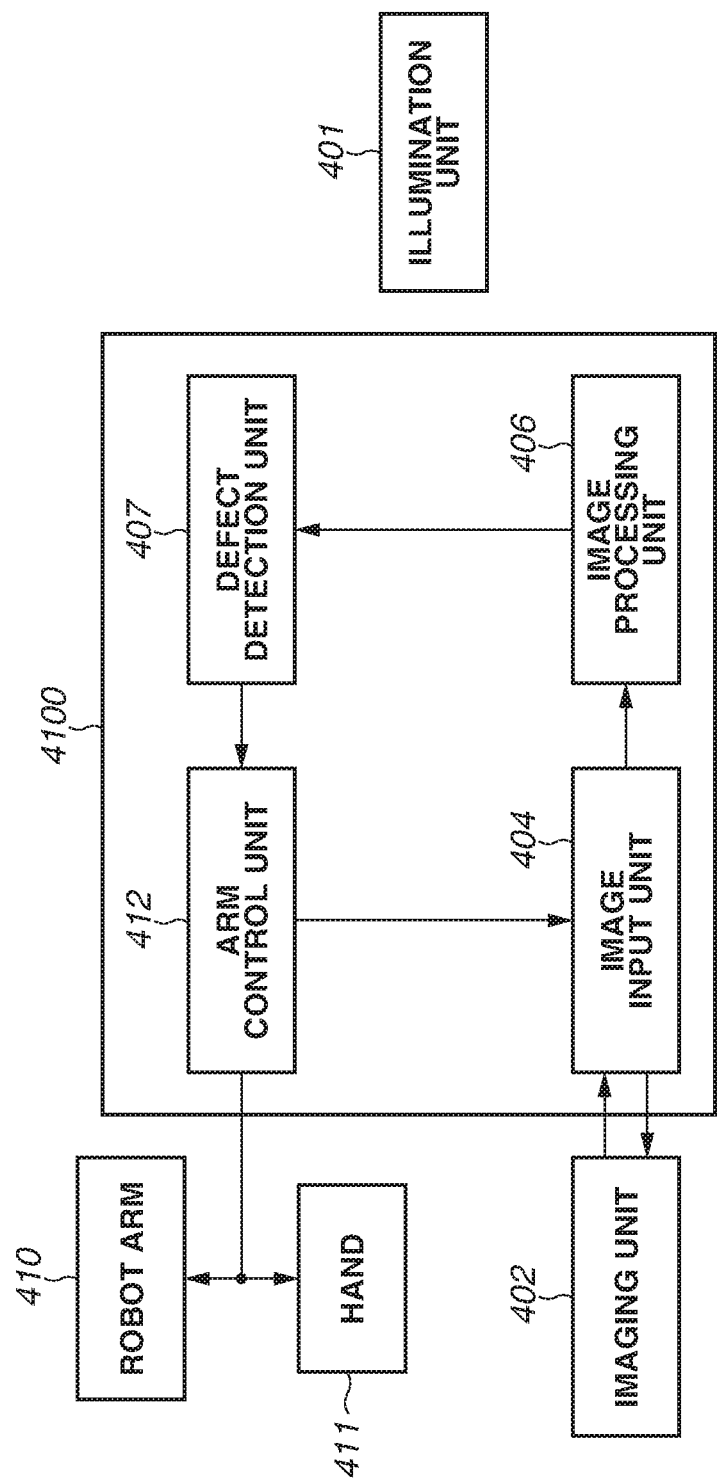
FIG. 15 is a functional block diagram of the information processing apparatus according to the fourth exemplary embodiment.

With reference to a schematic diagram in FIG. 14 and a block diagram in FIG. 15, a description is given of a defect inspection holding arm 4000 using an information processing apparatus 4100 according to the fourth exemplary embodiment of the present invention. A technique for performing defect inspection according to the fourth exemplary embodiment has many portions similar to those of the third exemplary embodiment. In FIGS. 14 and 15, components 401, 402, 404, 407, 4100, and 4200 are similar to the components 301, 302, 304, 307, 3100, and 3200, respectively, in the third exemplary embodiment and perform similar operations. Accordingly, only components 406, 410, 411, and 412, which are different from the third exemplary embodiment, are described in detail below.

A robot arm 410 moves to a desired location while holding a target object 4200 with a hand 411. An imaging unit 402 is attached to the robot arm 410 and can image the held target object 4200. The hand 411 holds the target object 4200 so that even if the robot arm 410 moves, the relative position and orientation relationships between the held target object 4200 and the imaging unit 402 do not change.

The robot arm 410 moves with a motion involving a rotational motion that changes the orientation of the target object 4200 relative to the surrounding environment. When the target object 4200 moves with a motion involving a rotational motion, the direction in which the target object 4200 is illuminated by an illumination unit 401 from the surrounding environment changes. The imaging unit 402 images the target object 4200 at the timing when the orientation of the target object 4200 changes by a rotational motion, the direction in which the target object 4200 is illuminated from the surrounding environment changes, and a different illumination state occurs. The illumination unit 401, however, is not limited to a light source in the surrounding environment. Alternatively, a light source may be attached, for example, to the body portion or the head of a robot and used as the illumination unit 401.

An arm control unit 412 controls the robot arm 410 and the hand 411, and when the robot arm 410 performs a rotational motion or a large amount of parallel translation, sends control signals to an image input unit 404 to cause the imaging unit 402 to capture images. Further, the arm control unit 412 receives a classification result from a defect detection unit 407 and determines the movement destination of the target object 4200 according to the presence or absence of a defect and the type of defect to control the robot arm 410 and the hand 411. The arm control unit 412 may be instructed by the user using a manipulator or instructed using the result of performing holding planning or path planning based on the result of a measurement using a measurement apparatus such as a three-dimensional (3D) scanner.

An image processing unit 406 receives a sequence of images from the image input unit 404 and performs positioning so that the target object 4200 is at the same pixel position. The processing after the sequence of images in which the correspondences between pixel positions are found is obtained and the processing of the defect detection unit 407 are similar to those in the third exemplary embodiment and therefore are not described here.

The defect detection unit 407 sends a classification result to the arm control unit 412.

[Defect Inspection/Holding Process]

Figure 16:
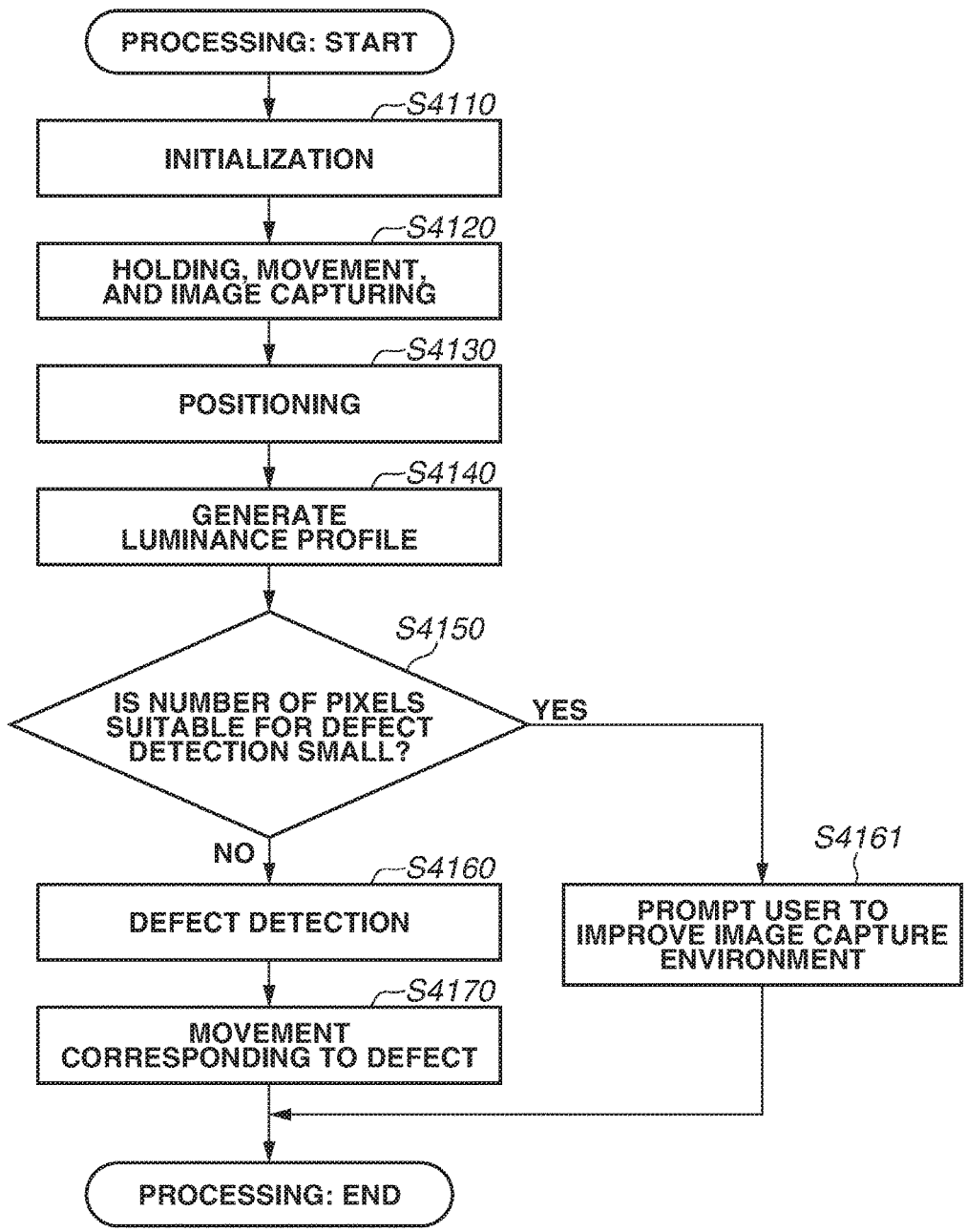
FIG. 16 is a flowchart illustrating processing of the information processing apparatus according to the fourth exemplary embodiment.

With reference to a flowchart in FIG. 16, a description is given of the flow of the processing of the defect inspection holding arm 4000 according to the fourth exemplary embodiment.

In step S4110, an initialization process is executed. The initialization process includes the start of the imaging unit 402, the start of the robot arm 410 and the hand 411, and the process in which the arm control unit 412 reads an operation.

When the initialization is completed, then in step S4120, the robot arm 410 and the hand 411 hold the target object 4200, and then, the robot arm 410 starts moving. The imaging unit 402 images the target object 4200 at the timing when the orientation of the target object 4200 changes by a rotational motion, and the direction in which the target object 4200 is illuminated from the surrounding environment changes. The obtained captured images are sent to the image processing unit 406.

Figure 13:
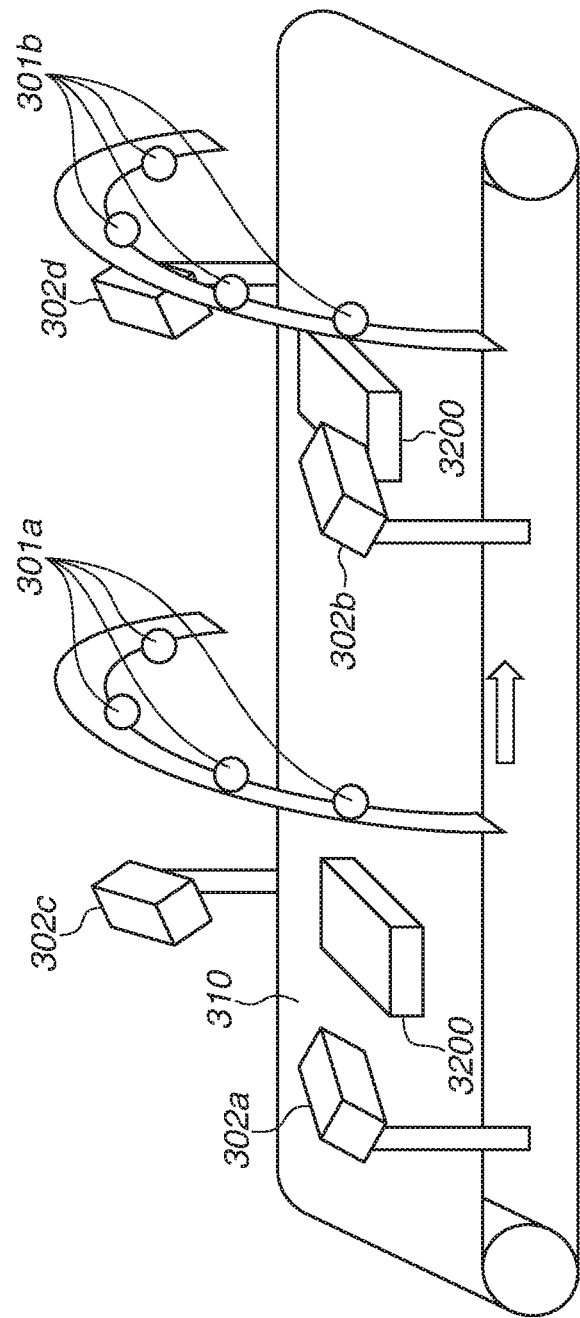
FIG. 13 is a diagram illustrating an example of a general configuration of a system using the information processing apparatus according to the third exemplary embodiment.

The processes of steps S4130 to S4160 are similar to the processes of steps S3130 to S3160 in FIG. 13 (the third exemplary embodiment) and therefore are not described here.

When the presence or absence of an abnormality and the type of defect are determined in the target object 4200, then in step S4170, the arm control unit 412 changes the movement destination based on the type of the defect.

With the above configuration, when a robot arm moves while holding a target object, the state of a change in the illumination of a surrounding light source on the target object by the movement is imaged, and defect detection is performed in a manner similar to the third exemplary embodiment, so that it is possible to determine the presence or absence of an abnormal state and the type of defect simultaneously with the holding movement and sort the target object by changing the movement destination based on the results of the determinations.

In each of the first to fourth exemplary embodiments, a target object in different illumination states is imaged in time series. The present invention, however, is not limited thereto. Alternatively, for example, the process may be performed for separating, by wavelength, images captured by shedding light from light sources having different wavelengths on a target object from different directions to generate a plurality of images in different illumination states by imaging the target object once, and then performing defect detection.

Further, in each of the first to fourth exemplary embodiments, an imaging unit images a target object while the relative positions of the imaging unit and the target object is fixed. The present invention, however, is not limited thereto. Alternatively, for example, corresponding pixels of the target object may be obtained between images from different viewpoints by tracking to find the correspondence relationships between pixels, and then defect detection is performed.

Further, in each of the first to fourth exemplary embodiments, the light source color of each illumination unit is not particularly limited. Alternatively, for example, if an imaging unit can capture an image in three channels of red, green, and blue (RGB), the illumination unit may simultaneously emit light from light sources of R, G, and B colors from three directions to acquire different illumination states for the respective color channels from a single captured image.

Further, in the third exemplary embodiment, an example has been described where a measurement is made while an imaging unit is placed on a conveyor belt and moves together with a target object. Alternatively, the imaging unit may image the target object at the timing when a shadow caused by the imaging unit blocking illumination from an illumination unit does not fall on the target object.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present exemplary embodiments, even if an unknown target object or a shadow occurs, it is possible to classify a plurality of abnormal states and detect the plurality of abnormal states as defects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-047633, filed Mar. 10, 2015, which is hereby incorporated by reference herein in its entirety.

What is claimed is:

1. An information processing apparatus for detecting a defect in a target object, the information processing apparatus comprising:
   a memory; and
   a processor in communication with the memory, the processor configured to provide:
      an illumination control unit configured to generate a plurality of different illumination states by switching lighting and extinction of each of a plurality of illumination units in times series, the plurality of illumination being placed at a plurality of different positions;

an acquisition unit configured to acquire an image group obtained by imaging the target object in the plurality of different illumination states and in a state where relative orientations of the target object and the plurality of illumination units change while the target object is being conveyed by a conveyance unit;

a generation unit configured to, based on luminance information of images included in the image group, generate a first luminance profile indicating a distribution of a luminance value of a first region in each of the images over the plurality of different illumination states generated in time series, and a second luminance profile indicating a distribution of a luminance value of a second region in each of the images over the plurality of different illumination states generated in time series; and a detection unit configured to detect a defect in the target object based on the first luminance profile and the second luminance profile.

2. The information processing apparatus according to claim 1, wherein in a case where a difference between the first luminance profile and the second luminance profile is equal to or greater than a predetermined value and a difference between a profile obtained by normalization of the first luminance profile and a profile obtained by normalization of the second luminance profile is less than the predetermined value, the detection unit determines that there is a difference in color between the first region and the second region.

3. The information processing apparatus according to claim 1, wherein the first luminance profile has the luminance value of the first region in each of the images as each component, wherein the second luminance profile has the luminance value of the second region in each of the images as each component, and wherein in a case where there is a variation in a ratio between each component of a profile obtained by normalizing the first luminance profile and a corresponding component of a profile obtained by normalizing the second luminance profile, the detection unit determines that there is a difference between normal vectors between the first region and the second region.

4. The information processing apparatus according to claim 1, wherein the first luminance profile has the luminance value of the first region of the images as each component, wherein the second luminance profile has the luminance value of the second region of the images as each component, and wherein in a case where a ratio between each component of a profile obtained by normalizing the first luminance profile and a corresponding component of a profile obtained by normalizing the second luminance profile is approximately constant, and there are outlier components a ratio between which is significantly different, and a luminance value of either of the outlier components is greater than the luminance values of components other than the outlier components, the detection unit determines that there is a difference in specularity between the first region and the second region.

5. The information processing apparatus according to claim 1, wherein the first luminance profile has the luminance value of the first region of the images as each component, wherein the second luminance profile has the luminance value of the second region of the images as each component, and wherein in a case where a ratio between each component of a profile obtained by normalizing the first luminance profile and a corresponding component of a profile obtained by normalizing the second luminance profile is approximately constant, and there is outlier components a ratio between which is significantly different, and the luminance value of either of the outlier components is smaller than luminance values of components other than the outlier components, the detection unit determines that a boundary caused by a shadow occurs between the first region and the second region.

6. The information processing apparatus according to claim 1, wherein the detection unit detects a shape defect, a hue defect, and a gloss defect on a surface of the target object by distinguishing the shape defect, the hue defect, and the gloss defect from each other.

7. The information processing apparatus according to claim 1, wherein the generation unit changes positional relationships between the plurality of illumination units, a conveyance unit, an imaging unit, and the target object based on the first luminance profile and the second luminance profile.

8. The information processing apparatus according to claim 1, further comprising a display unit configured to display an image of a result of distinguishing a type of defect classified by the detection unit.

9. An information processing method for detecting a defect in a target object, the information processing method comprising:

generating a plurality of different illumination states by switching lighting and extinction of each of a plurality of illumination units in time series, the plurality of illumination units being placed at a plurality of different positions;

acquiring an image group of images obtained by imaging a target object in the plurality of different illumination states and in a state where relative orientations of the target object and the plurality of illumination units change while the target object is being conveyed by a conveyance unit;

generating a first luminance profile indicating a distribution of a luminance value of a first region in each of the images over the plurality of different illumination states generated in time series, wherein the first region is a region corresponding between the images included in the image group, and a second luminance profile indicating a distribution transition of a luminance value of a second region in each of the images over the plurality of different illumination states generated in time series; and detecting a defect in the target object based on the first luminance profile and the second luminance profile.

10. A non-transitory storage medium having stored thereon a program for causing a computer to function as each unit of an information processing apparatus for detecting a defect in a target object, the information processing apparatus comprising:

an illumination control unit configured to generate a plurality of different illumination states by switching lighting and extinction of each of a plurality of illumination units in time series, the plurality of illumination units being placed at a plurality of different positions;

an acquisition unit configured to acquire an image group of images obtained by imaging the target object in the plurality of different illumination states and in a state where relative orientations of the target object and the plurality of illumination units change while the target object is being conveyed by a conveyance unit;

a generation unit configured to, based on luminance information of images included in the image group, generate a first luminance profile indicating a distribution of a luminance value of a first region in each of the images over the plurality of different illumination states generated in time series, and a second luminance profile indicating a distribution of a luminance value of a second region in each of the images over the plurality of different illumination states generated in time series; and a detection unit configured to detect a defect in the target object based on the first luminance profile and the second luminance profile.

* * * * *